United States Patent [19]

Wörner et al.

[11] 4,275,613

[45] Jun. 30, 1981

[54] DETENT MECHANISM FOR THE DIFFERENT POSITIONS OF A CHANGE-SPEED TRANSMISSION, ESPECIALLY FOR MOTOR VEHICLES

[75] Inventors: Günter Wörner, Kernen; Peter Schrape, Stuttgart, both of Fed. Rep. of Germany

[73] Assignee: Daimler-Benz Aktiengesellschaft, Stuttgart, Fed. Rep. of Germany

[21] Appl. No.: 30,958

[22] Filed: Apr. 17, 1979

[30] Foreign Application Priority Data

Apr. 20, 1978 [DE] Fed. Rep. of Germany ....... 2817168

[51] Int. Cl.³ .............................................. G05G 5/06
[52] U.S. Cl. ........................................ 74/475; 74/527; 267/158
[58] Field of Search .................... 74/475, 527; 267/158

[56] References Cited

U.S. PATENT DOCUMENTS

| | | | |
|---|---|---|---|
| 3,477,299 | 11/1969 | Speer et al. | 74/527 X |
| 3,601,230 | 8/1971 | Platz | 74/527 X |
| 3,731,554 | 5/1973 | Renk | 74/475 X |

*Primary Examiner*—Allan D. Herrmann
*Attorney, Agent, or Firm*—Craig and Antonelli

[57] ABSTRACT

A detent mechanism for holding shifting members of a mechanical transmission gear system in different shifted positions. The shifting members may be formed as shifting rocker arms pivotable about a bearing for shifting gears of the transmission. A detent contour may be provided at each shifting rocker arm with the detent contour being adapted to be engaged by a resiliently flexible member. A fixed bearing is arranged between the shifting rocker arm with the resiliently flexible member being constructed as a flat spring resting on the bearing and having free ends thereof counterbearing on the detent contours of the respective shifting rocker arms.

7 Claims, 8 Drawing Figures

DETENT MECHANISM FOR THE DIFFERENT POSITIONS OF A CHANGE-SPEED TRANSMISSION, ESPECIALLY FOR MOTOR VEHICLES

The present invention relates to a holding or positioning arrangement and, more particularly, to a detent mechanism for a motor vehicle mechanical transmission gear system which is provided with shifting rocker arm means pivotable about a bearing means for shifting gears of the gear system with the rocker arm means being provided with a detent contour adapted to be engaged by a resiliently flexible member so as to position or hold a shifting member in a shifted position.

In motor vehicle transmissions, it has been proposed to equip the transmission with a detent mechanism including a spring as well as a pin, activated by the spring, guided in a fixed sleeve with the pin being spherically rounded at an end thereof projecting from the fixed sleeve. The spherically rounded shaped pin rests in detent contours of a shifting rocker arm in three different positions.

A disadvantage of the proposed detent mechanism resides in the fact that, by virtue of the proposed arrangement, friction is produced not only between the detent contour and the spherically rounded pin, but primarily additional frictional forces occur which are produced while guiding the pin and the spring in the fixed sleeve with the additional friction being further increased when canting of the pin relative to the sleeve occurs.

The aim underlying the present invention essentially resides in providing a detent mechanism for a mechanical transmission which substantially reduces the frictional forces which generally occur during a shifting operation.

In accordance with advantageous features of the present invention, a fixed bearing means is provided between two shifting rocker arms with a flat spring being adapted to rest against the bearing means and have a counterbearing at detent contour means provided at the two shifting rocker arms. Advantageously, the flat spring may be fashioned as a shaped spring adapted in a central area thereof to a curvature of a bearing means with two ends of the spring, cooperable with the detent contour means, being shaped so as to have a contour complementary to the detent contour means.

In accordance with further advantageous features of the present invention, the shaped spring may be provided with two longitudinal slots in a zone of the curvature of the bearing means so as to result in the production of three webs of which a central or middle web extends around the curvature of the bearing from one side with the two outer webs extending around the curvature of the bearing from the other side. By virtue of the last-noted constructional features of the present invention, in the event the flat spring breaks, pieces of the flat spring are prevented from entering an interior of the transmission housing thereby avoiding the causing of any disturbances during a shifting operation or during a running of the vehicle transmission.

Additionally, in accordance with the present invention, the fixed bearing means, on which the center or middle area of a spring rests and by which the spring is held in any position, may be formed by a collared fastener such as, for example, a collar screw having a bearing collar which constitutes a bearing means for the shaped spring and rests on the transmission housing while a threaded shaft adjacent the collar is threadably secured into a corresponding threaded opening or bore in the transmission housing.

However, it is possible in accordance with the present invention, for the bearing means for the shaped spring to be fashioned as a pin which constitutes, at the same time, a bearing means for an elbow or bent lever for shifting the transmission into reverse.

By virtue of the utilization of a detent mechanism in accordance with the present invention, considerably less friction occurs than in conventional detent mechanisms since the friction forces between the spring and the pin, on the one hand, and the sleeve and the pin, on the other hand, are eliminated. Furthermore, the flat spring with the longer rocker arms is substantially inherently free of friction. Moreover, the linear contact between the shaped spring and the detent contour means is more favorable for the moving process and the size of the friction force than the spot-like contact occurring between a detent and a spherical contour.

Furthermore, by virtue of the utilization of a flat spring, a substantially simpler construction is realized which can more easily be manufactured in that the flat spring need merely be simply punched and pressed.

A further advantage of the detent mechanism of the present invention resides in the fact that, when gear shifting by means of a shifting rocker arm and during the thus-caused lifting of one side of the shaped spring by the detent contour means, the other side of the shaped spring is more firmly urged in contact with the detent contour means of the other rocker arm.

Additionally, it is also possible in accordance with the present invention to adapt such a shaped spring to predetermined or desired conditions in that the spring is bent to a greater or lesser extent. Thus, a shaped spring which is bent to a greater extent, that is, which is provided with a greater curvature, exhibits a flatter characteristic while the flatter shaped spring has a steeper characteristic.

Furthermore, in accordance with the present invention, cylindrical rollers may be rotatably supported on the shaped spring in a zone of the detent contour means so that the friction between the detent and shaped spring, caused by the shifting rocker arm, becomes primarily effective as a rolling friction.

Accordingly, it is an object of the preset invention to provide a detent mechanism for a vehicle transmission which avoids, by simple means, shortcomings and disadvantages encountered in the prior art.

Another object of the present invention resides in providing a detent mechanism of a vehicle transmission which is simple in construction and therefore relatively inexpensive to manufacture.

A further object of the present invention resides in providing a detent mechanism for a vehicle transmission which substantially reduces the friction forces which normally occur during a shifting of the transmission.

Yet another object of the present invention resides in providing a detent mechanism for a vehicle transmission which insures a smooth shifting of the transmission under all operating conditions.

These and other objects, features, and advantages of the present invention will become more apparent from the following description when taken in connection with the accompanying drawings which show, for the purposes of illustration only, several embodiments in accordance with the present invention, and wherein:

FIG. 2b is a partial top view of the construction shown in FIG. 2a;

Figure 1:
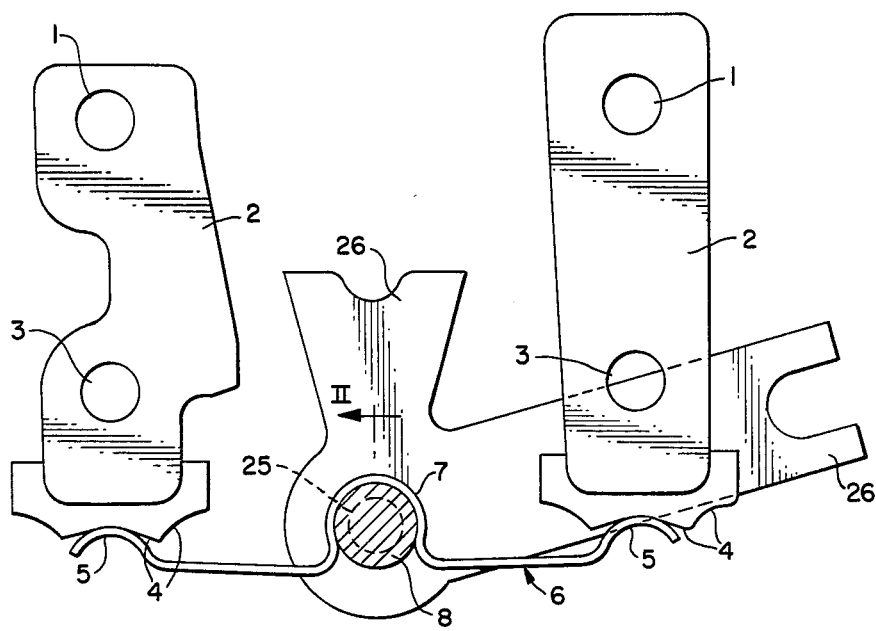
FIG. 1 is a partially-schematic elevational view of a detent mechanism in accordance with the present invention which includes a shaped spring resting in a central area on a bearing with two detent supports disposed on respective sides of the bearing.

Referring now to the drawings wherein like reference numerals are used throughout the various views to designate like parts and, more particularly, to FIG. 1, according to this figure, a portion of a mechanical automobile transmission is illustrated which includes shifting rocker arms 2 each of which is pivotable about a bearing pin means 1. Two gearshift forks 3 are respectively articulated to the shifting rocker arms 2 so that a pivoting of one shifting rocker arm 2 results in an associated gearshift fork 3 being moved to thereby shift an associated gear of the transmission. Detent contour means 4 are provided at free ends of each of the shifting rocker arms 2 with the contour means 4 being engaged by correspondingly shaped rounded ends 5 of a flat shaped spring 6. The flat spring 6, fashioned as a shaped spring, has a rounded or arcuate portion 7 in a central area thereof which is adapted to a curvature of a bearing means 8 on which the shaped spring 6 rests.

Figure 2:
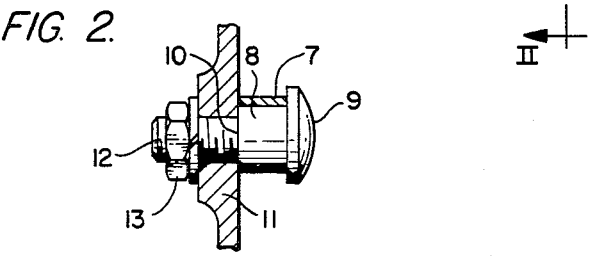
FIG. 2 is a cross-sectional view taken along the line II—II in FIG. 1.

As shown in FIG. 2, the bearing means 8 may be formed by a collared fastener means such as a bolt or screw 9 having a bearing collar which rests with its shoulder 10 on a portion of the transmission housing 11 with a threaded shank 12 adjoining the collar being fixed in a corresponding bore of the housing 11 and secured by, for example, a nut 13 or the like.

Figure 2A:
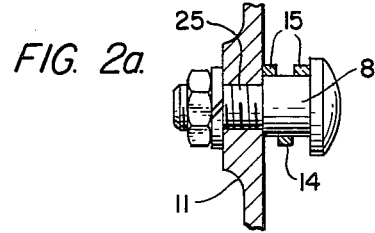
FIG. 2a is a cross-sectional view similar to FIG. 2 illustrating a modified bearing construction for the detent mechanism of the present invention.
Figure 2B:
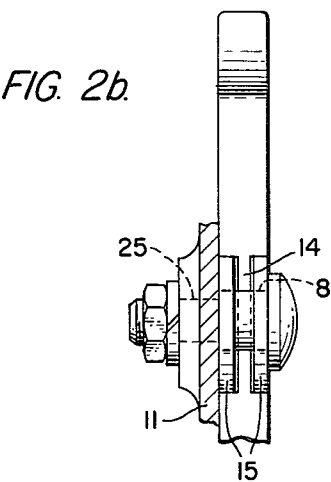

As shown in FIGS. 2a and 2b the shaped spring 6 may be formed so as to have two longitudinal slots in a central zone thereof extending around the bearing means 8 so that three flat spring webs are produced with a central web 14 extending around the curvature of the bearing means from one side thereof and with two outer spring webs 15 extending around the curvature of the bearing means 8 from the other side thereof.

Figure 3:
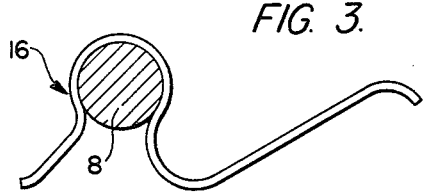
FIG. 3 is a partial cross-sectional view of a shaped spring of the detent mechanism of the present invention having a strong curve with a flat characteristic.
Figure 4:
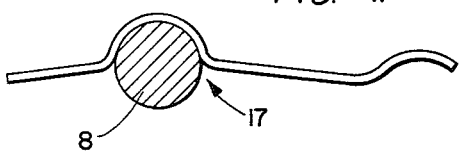
FIG. 4 is a cross-sectional view of a shaped spring of the detent mechanism in accordance with the present invention which is less strongly curved and with a steeper characteristic.

FIGS. 3 and 4 provide examples of shaped springs generally designated by the reference numerals 16, 17 having differing curvatures. More particularly, the spring 16 has a relatively strong curvature and, consequently, a flat spring characteristic; whereas, the shaped spring 17 has a lesser curvature but, in turn, a steeper spring characteristic.

The bearing means 8 may also be formed by a bolt 25 which, at the same time, represents a bearing for an elbow or L-shaped lever 26 for shifting the transmission into a reverse gear.

Figure 5:
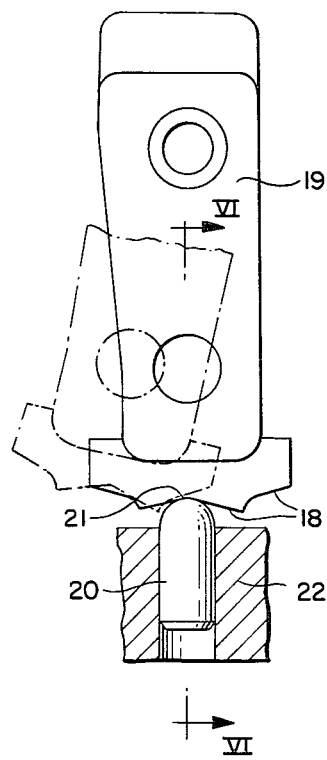
FIG. 5 is a partially-schematic cross-sectional view of a previously proposed detent mechanism in accordance with the present invention.
Figure 6:
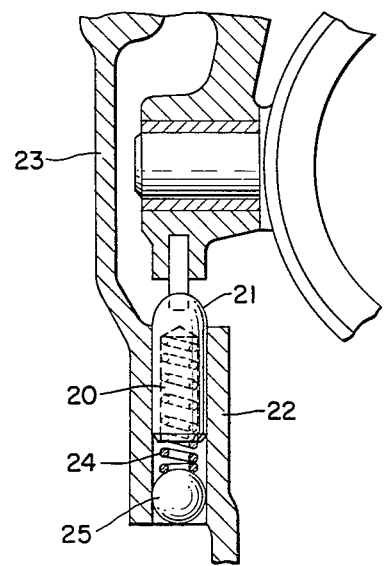
FIG. 6 is a cross-sectional view taken along the line VI—VI in FIG. 5.

FIGS. 5 and 6 provide an illustration of a previously proposed detent mechanism wherein a pin 20 is slidable along detent contours 18 of a shifting rocker arm 19 with the pin 20 having a spherically rounded free end 21 which faces and engages the detent contour 18.

As shown in FIG. 6, the pin 20 slides within a sleeve 22 fixedly arranged at a transmission housing 23 with a spring 24 being arranged in the sleeve 22 which spring rests, on the one hand, at a bottom of the pin 20 in its interior and, on the other hand, abuts a ball 25 pressed into the sleeve 22.

Figure 8:
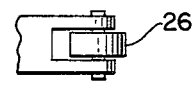
FIG. 8 is a top view of a portion of the right end of the shaped spring with rollers as shown in FIG. 7.
Figure 7:
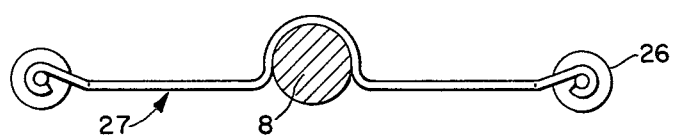
FIG. 7 is a cross-sectional view of a shaped spring of the detent mechanism of the present invention having cylindrical rollers rotatably supported at both of its free ends.

It is also possible in accordance with the present invention, in order to further reduce friction, to construct the detent mechanism so that the flat spring 6, fashioned as a shaped spring 27 which is adapted in a central area thereof to the curvature of the bearing, has both of its free ends rotatably supported on cylindrical rollers 26 shown schematically in FIGS. 7 and 8 in contact with rounded portions of the detent contour means 4.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A detent mechanism for holding shifting means of a mechanical transmission gear system in respective different shifting positions, the shifting means including a pair of spaced shifting rocker arm means pivotable about a bearing means for shifting gear means of the transmission, and detent contour means provided on each of the rocker arm means adapted to be engaged by a resiliently flexible member, characterized in that a fixed bearing means is arranged between the pair of shifting rocker arm means, and in that the resiliently flexible member includes a flat spring means having a portion thereof resting on the fixed bearing means and having free ends thereof counterbearing on the detent contour means of the respective shifting rocker arm means.

2. A detent mechanism according to claim 1, characterized in that the flat spring means is constructed as a shaped spring having a central area thereof adapted to a curvature of the fixed bearing means, and in that the respective free ends of the shaped spring have a curvature corresponding to a curvature of the detent contour means.

3. A detent mechanism according to claim 2, characterized in that the shaped spring includes two longitudinally extending slots in the central area thereof thereby resulting in the formation of three spring webs, one of the spring webs extends around a curvature of the fixed bearing means from one side thereof and the two other spring webs extend around the curvature of the fixed bearing means from the other side thereof.

4. A detent mechanism according to claim 3, characterized in that the three spring webs constitute inner and outer spring webs and a middle spring web disposed therebetween, and in that the middle spring web extends around the curvature of the fixed bearing means from one side and the two other spring webs extend around a curvature of the fixed bearing means from the other side thereof.

5. A detent mechanism according to one of claims 1, 2, or 3, characterized in that the fixed bearing means includes a fastening means having a collar means for forming a bearing surface for the shaped spring, the collar means includes a shoulder portion adapted to rest against a portion of a housing of the transmission, and in that the fastening means further includes a threaded shank adjoining the collar means which is adapted to be fixed in a bore means in the housing.

6. A detent mechanism according to one of claims 1, 2, or 3, characterized in that the fixed bearing means includes a bolt means adapted to be mounted at a portion of a housing of the transmission, said bolt means simultaneously serving as a bearing for a reverse shifting lever of the transmission.

7. A detent mechanism according to claim 1, characterized in that the flat spring means is constructed as a shaped spring having a central area thereof adapted to a curvature of the fixed bearing means, and in that rotatably supported cylindrical roller means are provided at respective free ends of the shaped spring for engaging curvatures of the detent contour means.

* * * * *